United States Patent [19]

Hasenauer et al.

[11] Patent Number: 4,505,977
[45] Date of Patent: Mar. 19, 1985

[54] THERMAL INSULATION

[75] Inventors: Dieter Hasenauer, Weinheim; Harald Reiss, Leimen, both of Fed. Rep. of Germany

[73] Assignee: Brown, Boveri & Cie AG, Mannheim, Fed. Rep. of Germany

[21] Appl. No.: 478,288

[22] Filed: Mar. 24, 1983

[30] Foreign Application Priority Data

Mar. 27, 1982 [DE] Fed. Rep. of Germany ....... 3211430

[51] Int. Cl.³ .................... H01M 6/36; H01M 10/39
[52] U.S. Cl. .................................... 428/363; 428/454; 428/428; 428/324; 428/69; 106/DIG. 3; 429/120
[58] Field of Search ............... 428/363, 454, 702, 428; 106/DIG. 3; 429/120

[56] References Cited

U.S. PATENT DOCUMENTS

| | | | |
|---|---|---|---|
| 687,531 | 11/1901 | Jefferson | 428/454 X |
| 1,123,985 | 1/1915 | Bölling | 106/DIG. 3 |
| 4,235,956 | 11/1980 | Gross et al. | 429/120 X |
| 4,383,013 | 5/1983 | Bindin et al. | 429/120 X |

FOREIGN PATENT DOCUMENTS

| | | | |
|---|---|---|---|
| 1216176 | 5/1966 | Fed. Rep. of Germany | 428/363 |
| 317640 | 10/1971 | U.S.S.R. | 428/454 |

Primary Examiner—George F. Lesmes
Assistant Examiner—Nancy A. B. Swisher
Attorney, Agent, or Firm—Herbert L. Lerner; Laurence A. Greenberg

[57] ABSTRACT

Thermal insulation with at least one evacuated space, within which several layers of a non-metallic material are arranged. Between two respective successive layers, an intermediate layer serving as a spacer is arranged. The layers forming the insulating material consist preferably of mica paper. The intermediate layers are formed by layers of fiberglass fabric or mica powder. Glass or ceramic fiber paper may also be used for forming the intermediate layers.

3 Claims, 2 Drawing Figures

U.S. Patent   Mar. 19, 1985   4,505,977

THERMAL INSULATION

BACKGROUND OF THE INVENTION

1. Field of Invention

The invention relates to thermal insulation with a double-walled housing with an evacuated space between the two housing walls in which at least one layer is arranged perpendicularly to the temperature gradient and impedes the heat flow between the two housing walls.

2. Description of the Prior Art

Such thermal insulation is used in power technology, especially, in apparatus in which heat losses are to be avoided. Thermal insulation is used, among other things, in high-temperature storage batteries of the alkali metal and chalcogen type. The storage cells are surrounded by thermal insulation in order to prevent them from cooling off, particularly during the operating pauses of the high-temperature storage batteries, so that after the pauses a temperature of 350° C. prevails in the storage cells, which is a necessary condition for optimum operation of the storage cells.

German Published Non-Prosecuted Application DE-OS 28 19 026 discloses an electrochemical storage battery with thermal insulation. The insulation is formed by an evacuated space, within which metal foils are arranged. The metal foils are arranged perpendicularly to the temperature gradient. The spacing of the metal foils is very small.

A disadvantage of this insulation is that it cannot be stressed in compression without a steep increase in its thermal conductivity. If it is loaded by a weight, the metal foils are pressed together whereby large-area contact points between the individual foils are increasingly formed. Thereby, the solid share of the total thermal conductivity of the thermal insulation is increased to values which can no longer be neglected.

Also known is a thermal insulation for high-temperature storage batteries which is composed of glass or mineral wool. In this insulation, considerable wall thicknesses must be provided to obtain an effect sufficient to keep the high-temperature storage batteries from cooling off too fast especially during the operating pauses, and also to maintain the operating temperature of 350° C. for a long time. Since such thick-walled insulation increases the dimensions and/or the weight of the high-temperature storage battery considerably, the energy storage density, i.e., the energy that can be stored per unit of weight or volume is small.

SUMMARY OF THE INVENTION

It is, therefore, an object of the invention to provide a thermal insulation which has a high pressure load-carrying capacity and at the same time low thermal conductivity.

With the foregoing and other objects in view, there is provided in accordance with the invention thermal insulation to impede heat flow therethrough and to be capable of being stressed in compression without a steep increase in its thermal conductivity which comprises a double-walled housing having an evacuated space between the two walls of the housing through which said heat flows with a temperature gradient from one wall of the double-walled housing to the other wall of the double walled housing, at least one layer of material disposed in said evacuated space and arranged perpendicularly to the temperature gradient to impede the heat flow between the two housing walls, said layer formed of thin-film, non-metallic material.

Other features which are considered as characteristic for the invention are set forth in the appended claims.

Although the invention is illustrated and described herein as embodied in thermal insulation, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
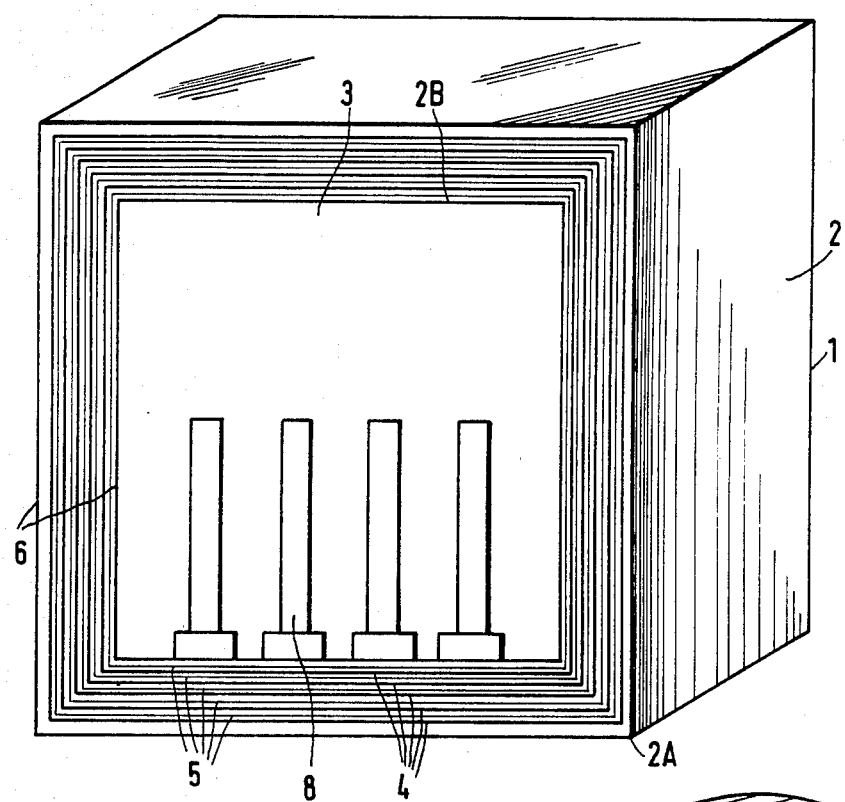
FIG. 1 shows a vertical section through a thermal insulation for a high temperature storage battery. The thermal insulation has an outer boundary wall and an inner boundary wall and between the walls an evacuated space containing a multiplicity of non-metallic parallel layers perpendicular to the temperature gradient and spaced by intermediate layers.

Within the evacuated space which forms the outer boundary of the thermal insulation, more than 100 thin laminar layers are arranged one behind the other. The layers are parallel to each other and are arranged at a predeterminable distance from each other. The spacing between two successive layers is smaller than 1 mm. The layers are preferably foils of mica paper. If the situation requires, the foils can also be formed partially of glass or ceramic paper. To form the layers, the mica paper can be wound around the inner boundary surface of the thermal insulation. Between every two successive layers, at least one intermediate layer serving as a spacer is arranged. The intermediate layer may consist of a layer of fiberglass fabric. According to the invention, the intermediate layer may also be formed by fiberglass paper. It is also possible to use ceramic fiber paper as the intermediate layer. If the thermal insulation is subjected to high compression loads, large-area contact between these layers is prevented by the layer of fiberglass fabric arranged between each two mica paper foils. If it can be foreseen that the thermal insulation will be subjected only to small compression loads, the intermediate layers can also be made of mica powder. The individual grains of the mica powder serve as rib-like spacers and can limit the contact between two adjacent layers to a finite number of points if the thermal insulation is stressed only slightly in compression. If the layers according to the invention are used, the space should have residual gas pressure of less than 0.1 mbar.

In contrast to the metal foil insulation used heretofore, no appreciable increase in the thermal conductivity comes about if foils of a non-metallic material are used, especially foils of mica paper, when the insulating material is loaded by external pressure. This fact can be made clear by the following consideration. If a thermal insulation which consists of many thin foils which are arranged parallel to each other, is compressed, large-area contacts are increasingly produced with increasing pressure loading from the initially point-shaped thermal bridges. The spacers arranged between two successive layers can prevent this only in part. Although the contacts are distributed statistically in the plane of the insulation, continuous thermal bridges are formed from the hot to the cold side, since the heat conduction in the plane of the foils interlinks the contact points. In metal foils, this effect is very large because of the high thermal conductivity $\lambda$. On the other hand, if foils of mica paper are used, the heat flow through the foil in the direction of its layer thickness and in its plane can be lowered drastically because of the much lower thermal conductivity $\lambda$ of this material. At a temperature of 300° C., the thermal conductivity of aluminum is $\lambda \approx 200$ W/(m·K), while the thermal conductivity of mica paper is $\lambda \approx 0.2$ W/(m·K). The heat flux, if mica paper is used, is therefore approximately 1000-times smaller than with aluminum foils for the same number of contact points. Up to now, metal foils have been used particularly because they have an especially good insulating effect which is based on the high thermal coefficient of reflection of these metal foils. The foils of mica paper used in the thermal insulation according to the invention, on the other hand, have a substantially lower reflectivity than the conventionally used metal foils, so that they have greater thermal emissivity. The radiation power Q through a plane, multi-layer thermal insulation is described by the following equation:

$$\dot{Q} = \frac{\dot{Q}_o}{1 + N(\epsilon_o/\epsilon_f)}$$

$\dot{Q}$ here means the radiation power between two plane parallel walls of different temperature if no foil is arranged between the walls, N is the number of foils, $\epsilon_o$ is the thermal emissivity of the walls and $\epsilon_F$ is the thermal emissivity of the foils.

If metal foils are used, $\epsilon_F$ has a value of 0.05. With $\epsilon_o = 0.9$, one obtains for a thermal insulation with several plane metallic layers:

$$\dot{Q} = \dot{Q}_o/(1 + 18N)$$

According to the invention, foils of a non-metallic material are used instead of metallic layers. For the radiation power $\dot{Q}$ through a plane insulation, the insulating material of which consists of mica paper, the following value is obtained:

$$\dot{Q} = \dot{Q}_o/(1 + 1.3N),$$

where $\epsilon_o/\epsilon_F = 0.9/0.7 = 1.3$.

From this it is seen that the same reduction of the radiation power can be achieved by a number of mica foils which is increased only 14-times over that of metal foils. This in no way means that the thermal insulation will thereby have an extremely large thickness. To illustrate, 500 mica foils in which a fiberglass fabric layer is arranged between every two successive mica foils has a total thickness of the insulation of at most 35 mm. The insulation has a similar dimension of the intermediate layer arranged between each two successive mica foils is formed by a glass or ceramic fiber paper. It is assumed here that the mica foils used each have a thickness of 50 $\mu$m. Mica foils with this small layer thickness are commercially available.

The invention will be explained in the following, making reference to drawings, where FIG. 1 shows the thermal insulation 1 which is bounded by a double-walled housing 2. The latter is of rectangular cross section. It has an interior 3 which is suitable, for instance, for receiving storage cells. The walls of the housing 2 are made of steel or alloy steel. The outer and inner boundary walls 2A and 2B of the housing 2 are arranged parallel to each other at a predeterminable distance. The distance between the inner and outer boundary walls 2A and 2B depends on the thickness of the insulation 1. Between the outer and inner boundary walls of the housing 2 is the evacuated space 6. The outer metallic boundary walls 2A are connected to each other gastight and in particular, are welded to each other. The same applies to the inner metallic boundary walls 2B of the housing. The space 6 located between the walls 2A and 2B can thereby be hermetically sealed. In particular, it can be evacuated permanently. In the embodiment example shown here, the space 6 has a residual gas pressure of less than 0.1 mbar. Before the space 6 is sealed gastight and evacuated, the insulating material 4 is placed therein. In the embodiment example shown here, the insulating material 4 consists of a multiplicity of thin planar layers. The layers 4 are arranged one behind the other in parallel planes perpendicularly to the temperature gradient.

Between each two successive layers 4, a spacing of defined size is provided. In order that the spacing between each two successive layers 4 is maintained, an intermediate layer 5, which serves as a spacer, is arranged between each of them. In the embodiment example shown, the intermediate layers 5 are formed by a fiberglass fabric layer. A ceramic fiber paper can also be used as the intermediate layer 5 instead of a fiberglass fabric layer. If the thermal insulation is not stressed in compression, contact between two successive foils of mica paper is completely avoided by the intermediate layers. The number of layers 4 arranged one behind the other within the space 6 depends on the desired residual radiation power of the thermal insulation 1. If the thermal insulation is used for a high-temperature storage battery such as the storage cells 8 which are to be held at a constant temperature of 350° C., at least 500 layers of mica paper are arranged inside the space 6. In the fabrication of the thermal insulation 1, the mica paper forming the layers 4 is preferably wrapped around the inner boundary walls 2B of the housing. An intermediate layer of fiberglass fabric is inserted between each two successive layers of such a winding. Fiberglass or ceramic paper can, likewise, be used for forming the intermediate layer. If, for instance, 500 layers 4 with the respectively required layers 5 are wrapped around the inner boundary walls 2B of the housing 2, the thermal insulation 1 has a total thickness of at most 35 mm. It is assumed here that each layer 4 has at most a thickness of 50 $\mu$m and the layers of fiberglass fabric or the fiberglass or ceramic papers each are 20 $\mu$m thick. Thicker fiberglass fabric layers or fiberglass or ceramic papers can also be used, but the total thickness of the insulation is increased thereby. The space 6 should desirably therefore have at most a width of 40 mm. If all required layers 4 are arranged within the space 6, the outer boundary walls 2A of the housing 2 are connected gastight to each other.

The space 6 is subsequently evacuated to remove gas therefrom i.e. produce a vacuum. The storage cells 8 of a high-temperature storage battery of the sodium-and-sulfur type are arranged in the interior 3 of the housing 2 with the thermal insulation 1. The storage cells 8 are connected to the outside via electric leads (not shown). Special openings in the thermal insulation 1 are provided for bringing the electric leads (not shown) out. The thermal insulation is compressed, especially in the region of the contact area of the storage cells 8 by the external atmospheric pressure and the weight of the storage cells 8. This brings about a reduction of the distance between the individual layers 4 of the thermal insulation 1. A large-area contact of two respective successive layers 4 is prevented by the intermediate layers 5. However, the layers 4 cannot be prevented from approaching each other by the intermediate layers 5. This is no disadvantage in the thermal insulation shown here, however, since the very low solid-body thermal conductivity of the foils 4 causes the total conductivity of the thermal insulation 1 to be increased only inappreciably thereby.

Figure 2:
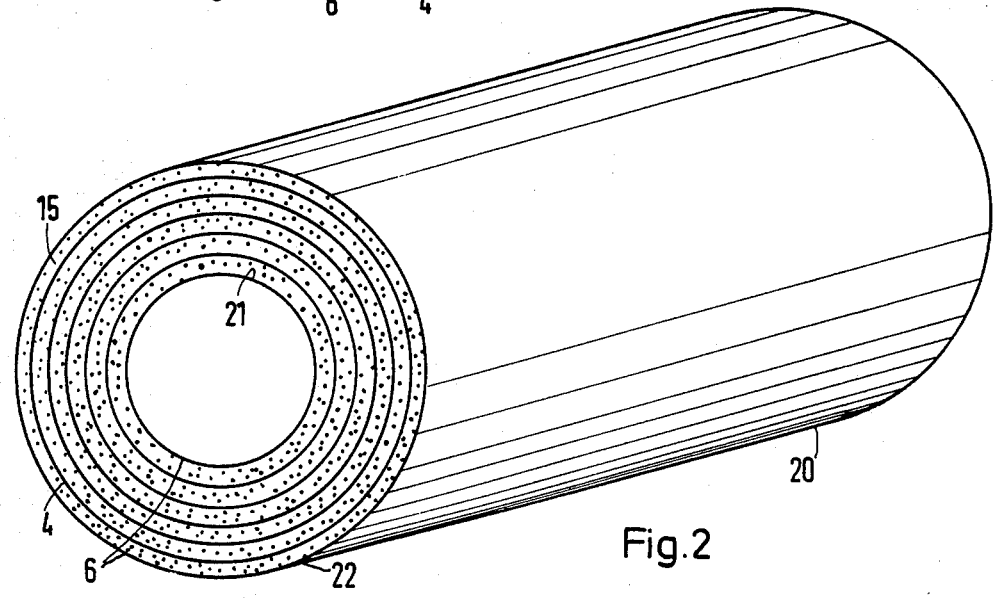
FIG. 2 shows a pipe with the thermal insulation in which the inner and outer walls are cylinders, the layers in the evacuated space are mica paper, and the intermediate layers are mica powder.

FIG. 2 shows a further embodiment of the thermal insulation 1. The latter is arranged here around a piping system 20, inside which hot flowing media such as gases are transported. FIG. 2 shows only a limited detail of this piping system 20. The thermal insulation is formed here also by a space 6 which is sealed gas-tight from the outside. The space 6 is bounded by two tubes 21 and 22 which have different diameters. In particular, the tube 21 which has the smaller diameter is arranged within the tube 22. This creates a uniform space between the two tubes 21 and 22 which, as the space 6, serves for the thermal insulation 1. At the ends of these two tubes 21 and 22, the space 6 is terminated by metallic washers (not shown) in a gastight manner. The insulating material 4 here is also formed by foils of mica paper. The mica paper is wrapped around the tube 21 to form the layers. Between two respective successive layers 4 of mica paper, an intermediate layer 15 is arranged. In the embodiment example shown here, the intermediate layer is formed by mica powder. Mica powder can be used as the intermediate layer if the thermal insulation is not subjected to excessive compression stresses. If a flowing medium is conducted through the interior of the tube 21, no appreciable compression load of the thermal insulation comes about. The mica paper layers 4 are not compressed thereby. A pressure loading of the thermal insulation from the outside is kept away from the layers 4 by the tube 22. The hollow space 6 formed between the two tubes 21 and 22 is evacuated here also. It has desirably a residual gas pressure of at most 0.1 mbar. Mica powder can be used also with the thermal insulation shown in FIG. 1 for forming the intermediate layer, if no excessive compression stress of the thermal insulation is expected.

In the two embodiment examples shown in FIGS. 1 and 2, the layers 4 consist of mica paper.

The invention is not limited to the embodiment examples shown in FIGS. 1 and 2, but rather covers any thermal insulation in which the insulating material consists of layers which are made of non-metallic material.

We claim:

1. Thermal insulation to impede heat flow therethrough and capable of being stressed in compression without a steep increase in its thermal conductivity, which comprises, a double-walled housing having a single continuous evacuated space between the two walls of the housing through which said heat flows with a temperature gradient from one wall of the double-walled housing to the other wall of the double-walled housing, about 500 spaced layers formed from foils of mica paper are arranged parallel and one behind the other within and perpendicularly to the temperature gradient to impede the heat flow between the two housing walls, between each two successive layers of mica paper is disposed at least one intermediate layer of mica powder as a spacer and the layers of mica paper are wrapped around the outside surfaces of the inner boundary of the housing, and the evacuated space containing the layers and the intermediate layers has a residual gas pressure of less than 0.1 mbar.

2. Thermal insulation to impede heat flow therethrough and capable of being stressed in compression without a steep increase in its thermal conductivity, which comprises; a double-walled housing having a single continuous evacuated space between the two walls of the housing through which said heat flows with a temperature gradient from one wall of the double-walled housing to the other wall of the double-walled housing, about 500 spaced layers formed from foils of glass fiber paper are arranged parallel and one behind the other within and perpendicularly to the temperature gradient to impede the heat flow between the two housing walls, between each two successive layers of glass fiber paper is disposed at least one intermediate layer of mica powder as a spacer and the layers of glass fiber paper are wrapped around the outside surfaces of the inner boundary of the housing, and the evacuated space containing the layers and the intermediate layers has a residual gas pressure of less than 0.1 mbar.

3. Thermal insulation to impede heat flow therethrough and capable of being stressed in compression without a steep increase in its thermal conductivity, which comprises; a double-walled housing having a single continuous evacuated space between the two walls of the housing through which said heat flows with a temperature gradient from one wall of the double-walled housing to the other wall of the double-walled housing, about 500 spaced layers formed from foils of ceramic fiber paper are arranged parallel and one behind the other within and perpendicularly to the temperature gradient to impede the heat flow between the two housing walls, between each two successive layers of foils of ceramic fiber paper is disposed at least one intermediate layer of mica powder as a spacer and the layers of ceramic fiber paper are wrapped around the outside surfaces of the inner boundary of the housing, and the evacuated space containing the layers and the intermediate layers has a residual gas pressure of less than 0.1 mbar.

* * * * *